Feb. 8, 1927.
T. G. HAMILTON
AIR TEMPERING DEVICE
Original Filed Aug. 4, 1922    3 Sheets-Sheet 1
1,617,050
*Fig. 1.*
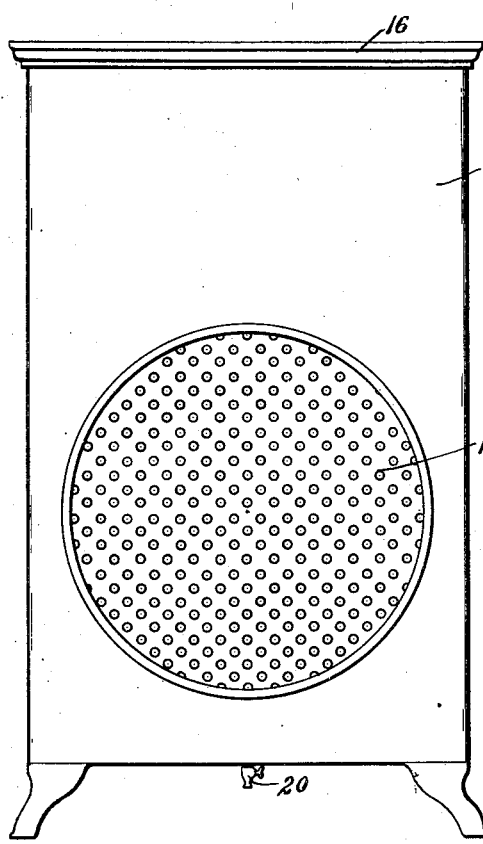
*Fig. 2.*
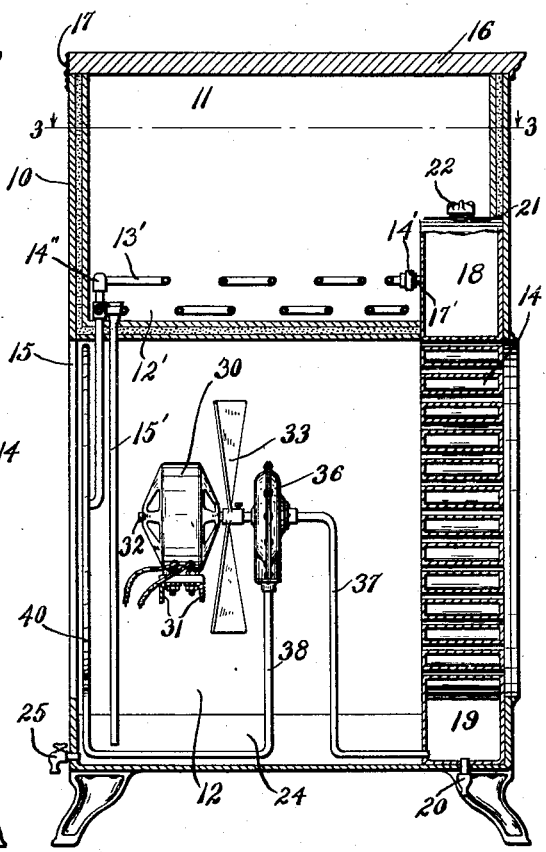
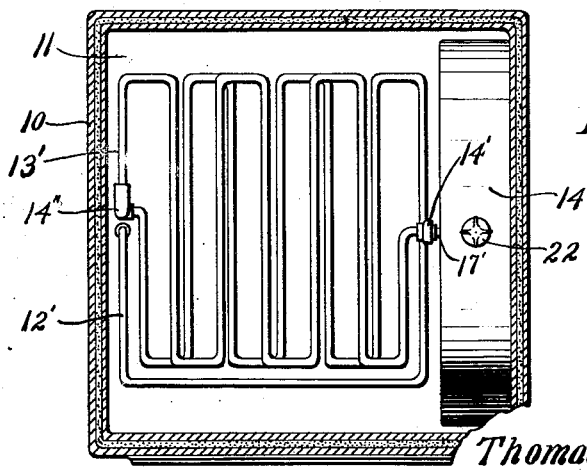
*Fig. 3.*
Thomas G. Hamilton.
INVENTOR
BY Victor J. Evans.
ATTORNEY
WITNESS:

Feb. 8, 1927.

T. G. HAMILTON

AIR TEMPERING DEVICE 1,617,050

Original Filed Aug. 4, 1922    3 Sheets-Sheet 2

Thomas G. Hamilton
INVENTOR

BY Victor J. Evans
ATTORNEY

WITNESS:

Feb. 8, 1927.

T. G. HAMILTON 1,617,050

AIR TEMPERING DEVICE

Original Filed Aug. 4, 1922    3 Sheets-Sheet 3

Thomas G. Hamilton.
INVENTOR

BY Victor J. Evans
ATTORNEY

Patented Feb. 8, 1927.

1,617,050

UNITED STATES PATENT OFFICE.

THOMAS G. HAMILTON, OF BISHOP, TEXAS.

AIR-TEMPERING DEVICE.

Application filed August 4, 1922, Serial No. 579,715. Renewed October 13, 1926.

This invention relates to an air tempering device, which may also be employed with certain modifications as an air heating apparatus.

One object is to provide means for cooling the air of a room, apartment or building by providing a cooling chamber through which water is circulated in the presence of a cooling agent and in suitable coils, a temperature changer through which the cooled water is caused to pass, with means for producing sufficient fluid pressure to insure circulation, and means for passing a current of air through the temperature changer and into the room or building to be cooled.

A further object is to provide a device which may take the form of a cabinet, readily moved from place to place, and presenting a good appearance, and adapted to be electrically operated, so far as the forced circulation of air and water are concerned.

A still further object is to provide a device which shall include a chamber in which suitable coils are installed, the chamber being adapted to receive either a cooling agent, or a heating element which may be operated electrically and which shall serve to heat the fluid circulating through the apparatus, and therefore heat the air current passing therethrough into the apartment.

With the foregoing and other objects in view, the invention consists in the novel construction and arrangement of elements described and claimed, it being understood that modifications may be made within the scope of the claims without departing from the spirit of invention.

Figure 7:
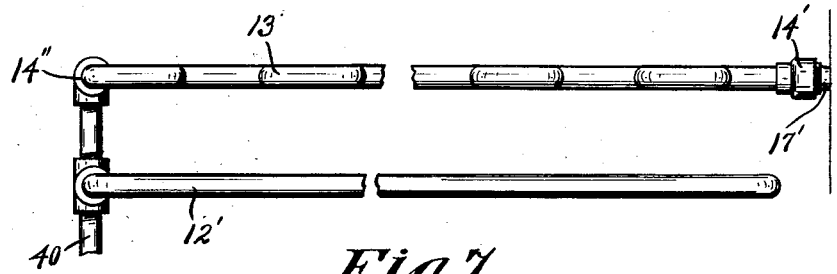
Figure 8:
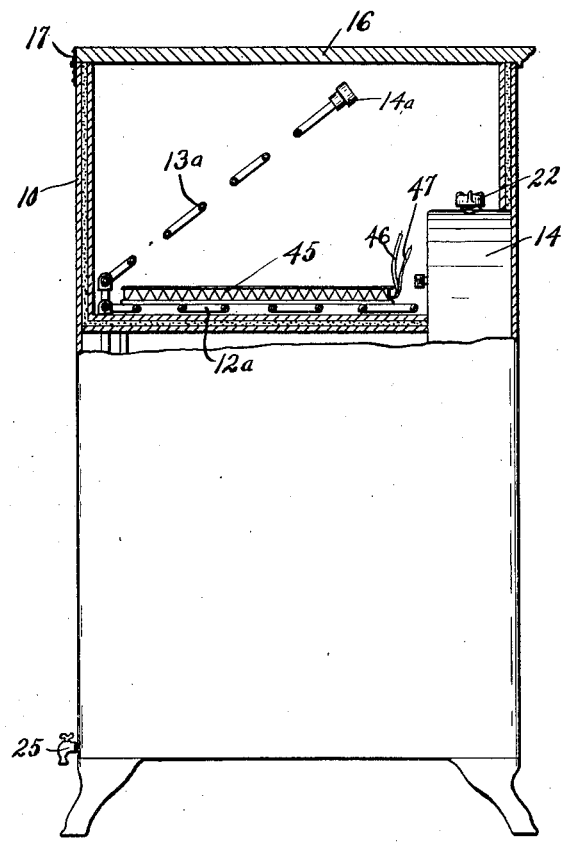
Figure 4:
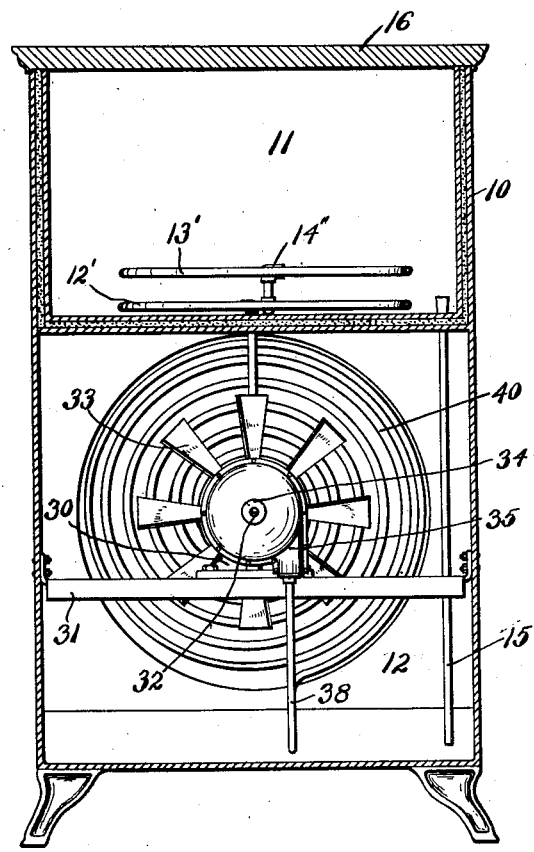
Figure 5:
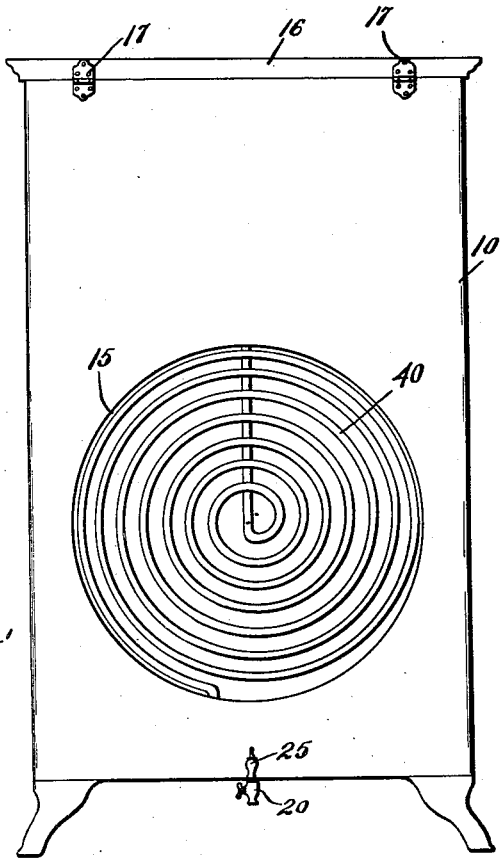
Figure 6:
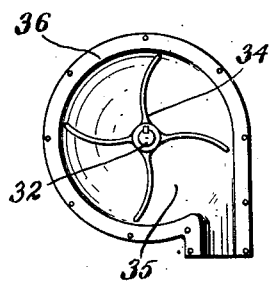

In the drawings, Figure 1 shows the device in front elevation; Figure 2 is a vertical section; Figure 3 is a horizontal section, on line 3—3 of Figure 2; Figure 4 is a vertical section in a plane perpendicular to the plane on which the section of Figure 2 is taken; Figure 5 is a rear elevation; Figure 6 is a detail view of the pump for forced circulation of fluid; Figure 7 is a detail view of the coils of the upper chamber; Figure 8 shows a modified form, partly in vertical section, an electric heating element being located between the coils of the upper chamber, and one of these coils being raised.

The cabinet or housing 10 may be of sheet metal, the frame being of angle iron. The ice chamber however is formed with insulated walls. The whole device is intended to present an attractive appearance as an article of furniture, and the size and proportion may of course be varied to suit the conditions. The essential features may also be employed in connection with a cooling apparatus constructed on a larger scale. The housing 10 is provided with an upper chamber 11 constituting a cooling chamber and a lower chamber 12 through which air is caused to pass through the radiator or temperature changing element 14, the intake for the air being on the opposite side of the casing at 15. The chamber 11 is accessible for the introduction of ice or the like, or for the introduction of a heating element, by lifting lid 16, hinged at 17.

An upper water compartment for the element 14 is designated 18, a lower compartment being shown at 19 and a drain for the latter at 20. A water inlet for the element 14 is designated 21, and is closed by a cap 22.

In chamber 11 I locate a plurality of water coils, designated 12' and 13' having communication through connection 17' with the upper compartment or tank 18. The coil 13' may be disconnected at the union or coupling 14', and may then be turned about the connection 14" where a union or coupling is also installed,—in order to permit this coil 13' to be elevated at the forward end for the purpose intended below.

Water from the melting ice accumulates to a depth of one inch, more or less, in the chamber 11, the upper end of pipe 15' projecting slightly above the bottom of the chamber, and the lower end communicating with the tank 24 constituting a drain receptacle, and provided with a drain petcock 25.

An electric motor 30 is mounted on suitable supports 31, the armature shaft being designated 32 and mounting a fan 33. Also carried by this shaft is a rotor 34 of a pump 35, the casing of the latter being designated 36 and having communication by means of pipe 37 with lower tank 19. Pipe 37 constitutes an inlet for the pump, and pipe 38 conveys water under a moderate degree of pressure downwardly through drip tank 24 and thence through pipe 40, which may take the form of a coil and which is designed to deliver water through the upper coils 12' and 13' to the upper water compartment 18.

Pipe or coil 40 is located in or opposite the air intake 15 of the casing or housing, and the air passes thence directly through the housing through element 14, and into the room or rooms to be cooled. It will be observed that the temperature of the water passing from the element 14 is first cooled to a moderate extent before being forced by the fan through the element 14, where the air passes between the coils or wells containing the water which has been cooled to a maximum extent after having passed through coils 12' and 13' in the ice chamber. The ice would usually rest directly upon coils 13'.

In the form of the device shown in Figure 8, a heating element 45 is shown as being located between coils 12$^a$ and 13$^a$, the coil last named having been elevated at the forward end by detaching the union 14$^a$, in order to permit the heating element to be properly located. This element 45 may have the form of an electrical resistance element, suitable connections of course being provided as shown at 46 and 47.

Having thus described my invention, I claim:

1. In a device of the class described, a housing, including an upper chamber and a lower chamber, the upper chamber being adapted to receive a temperature changing element, one side of the lower chamber being in communication with the outer air, through an inlet, a heat exchanger in the lower chamber, a fan within the chamber last named and positioned to force air from this chamber through the heat exchanger, means permitting water circulation through the heat exchanger and the upper chamber, a pump connected with said means, and a motor including a shaft mounting an operative element of the pump and mounting said fan.

2. In a device of the class described, a housing, including an upper chamber and a lower chamber, one side of the lower chamber being in communication with the outer air, through an inlet, a heat exchanger in the lower chamber, a fan within the chamber last named and positioned to force air from this chamber through the heat exchanger, means permitting water circulation through the heat exchanger and the upper chamber, a pump connected with said means, and a motor including a shaft mounting an operative element of the pump and mounting said fan, said means permitting water circulation including a plurality of coils in the upper chamber, one of the coils being mounted to permit of tilting upwardly at one side thereof for inserting a heating element between the coils.

3. In a device of the class described, a housing including an upper chamber and a lower chamber, one side of the lower chamber being in communication with the outer air, through an inlet, a heat exchanger in the lower chamber, a fan within the chamber last named and positioned to force air from this chamber through the heat exchanger, means permitting water circulation through the heat exchanger and the upper chamber, a pump connected with said means, and a motor including a shaft mounting an operative element of the pump and mounting said fan, said means permitting water circulation including a coil located in the air inlet, and a drip tank in communication with the bottom portion of the heat exchanger and with the upper chamber at a point above the lower wall thereof.

In testimony whereof I affix my signature.

THOMAS G. HAMILTON.